Feb. 10, 1925.

L. M. WOOLSON

MOTOR VEHICLE

Filed July 29, 1920

1,525,487

Inventor,
Lionel M. Woolson,
By
Atty.

Patented Feb. 10, 1925.

1,525,487

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed July 29, 1920. Serial No. 399,671.

*To all whom it may concern:*

Be it known that I, LIONEL M. WOOLSON, a citizen of the United States, and resident of Detroit, Wayne County, State of Michigan, have invented certain new and useful Improvements in Motor Vehicles, of which the following is a specification.

This invention relates to motor vehicles and more particularly to shock absorbing mechanism therefor.

One of the objects of the invention is to simplify the construction of shock absorbers and to provide a device of this character having a minimum number of parts.

Another object of the invention is to provide a relatively small device of the character described but a construction that will successfully operate throughout a wide range of movement.

Another object of the invention is to provide a shock absorber of the hydraulic type having means whereby the rate of flow of the fluid utilized in the device may be regulated.

Further objects of the invention will appear from the following specification taken in connection with the drawings which form a part of this application, and in which.

Figure 1:
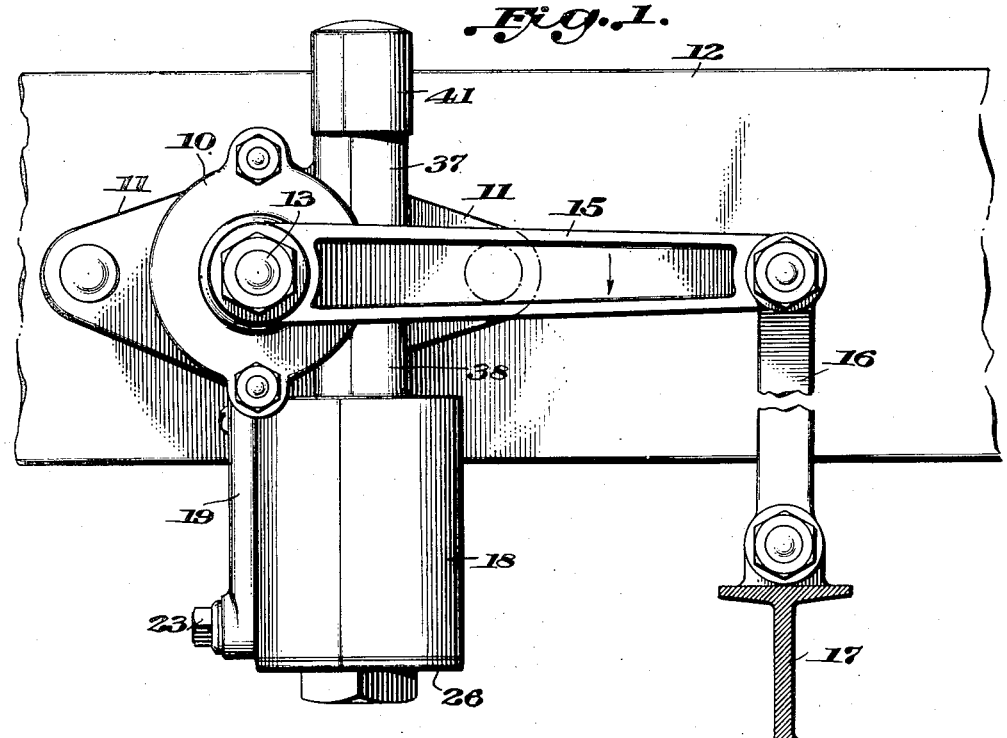
Fig. 1 illustrates a shock absorber constructed in accordance with my invention mounted upon one of the side frame members of a motor vehicle, the vehicle axle being shown in section.
Figure 2:
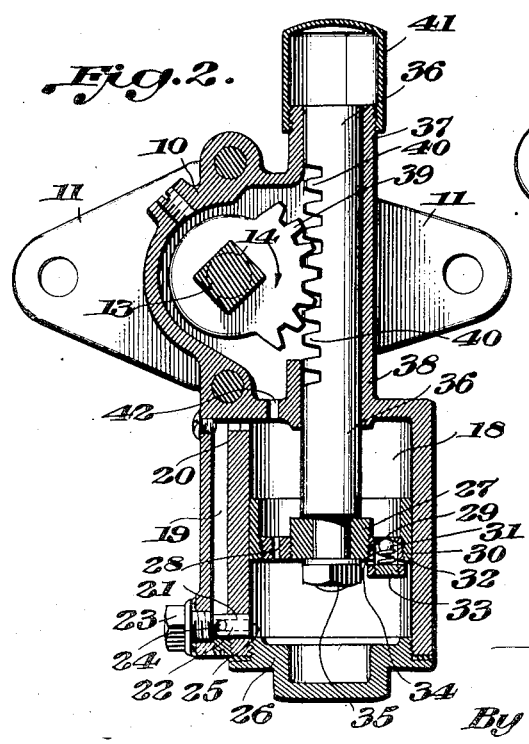
Fig. 2 is a vertical sectional view of the shock absorber shown in Fig. 1.

Referring first to the embodiment of the invention illustrated in Figs. 1 and 2, I have shown a shock absorber comprising a body member 10 having outwardly extending lugs 11, which are shown in Fig. 1 as secured to a side frame member 12 of the motor vehicle.

The member 10 has a rock shaft 13 rotatably mounted therein, this shaft having a square portion 14 on which is secured an arm 15, the opposite ends of the arm being connected by a link 16 to one of the axles 17 of the vehicle. It will, of course, be understood that the usual springs are interposed between the frame and axle of the vehicle.

A cylinder 18 is formed on the lower portion of the body member 10, this portion having also formed thereon a conduit 19 which is connected at its upper and lower ends, as shown at 20 and 21, with the interior of the cylinder 18. Intermediate the lower end of the conduit 19 and the interior of the lower portion of the cylinder 18, I have interposed a tubular member 22 which is formed on or secured to a screw plug 23, the member 22 having a lateral opening 24 into the conduit 19 and having a longitudinal opening 25 which communicates with the opening 24 and with the interior of the cylinder 18. By changing the screw plug 23 above described, the rate of flow of the fluid from the conduit into the cylinder may be accurately regulated, and it will be evident that this adjustment may be made easily since it is not necessary to gain access to the interior of the cylinder 18 but merely to unscrew the plug and substitute a plug with different sizes of openings.

The lower end of the cylinder 18 is closed by means of a cap 26, which in this instance is screw-threaded into the lower end of the cylinder. A piston 27 is reciprocably mounted in the cylinder 18 and is provided with a restricted opening 28 which permits the slow or gradual passage of the oil or fluid from one side of the piston to the other, and the piston is also provided with a port 29, this port being formed in a tubular member 30 which is screw-threaded into the piston. A ball valve 31 is adapted to seat on the port 29, and a spring 32 engages at one end the ball valve and at its opposite end a plug 33, which is screw-threaded into the lower end of the tubular member 30. The member 30 is provided with a pair of lateral openings 34 which communicate with the interior of the cylinder 18.

Piston 27 is secured by means of a bolt 35 to the lower end of a piston pin or rod 36 reciprocably mounted in guiding portions 37 and 38 of the body member 10, and this rod is reciprocated by means of a segmental gear or a pinion 39 mounted on the rock shaft 13, the teeth of the pinion engaging rack teeth 40 formed on the piston pin 36. A cap 41 is mounted on the upper end of the body member 10 and forms a casing for enclosing the upper end of the pin 36 as this pin is reciprocated. The upper wall of the cylinder 18 is provided with a vent 42 for the passage of air.

The shock absorber above described operates as follows: When the vehicle frame and axle are separated due to an irregular road surface, the movement of the arm 15 in a clockwise direction rotates the pinion 39 in the direction of the arrow shown in Fig. 2, thereby forcing the piston pin 36 and piston 27 downwardly into the cylinder 18. Assuming that the cylinder is substantially filled with fluid such as oil, the downward movement of the piston will be retarded by the oil and the oil will gradually be forced upward through the restricted opening 28, and a portion of the oil will also pass through the tube 21 and conduit 19 to the upper portion of the cylinder 18. As the frame and axle return to their normal position, the oil will pass downwardly through the port 29, the ball valve being forced from its seat, and the oil will also pass downwardly through the conduit 19 to its former position. As above stated, the rate of passage of the oil through the conduit 19 may be regulated by changing the screw plugs and substituting a plug with different sizes of openings therein.

Figure 3:
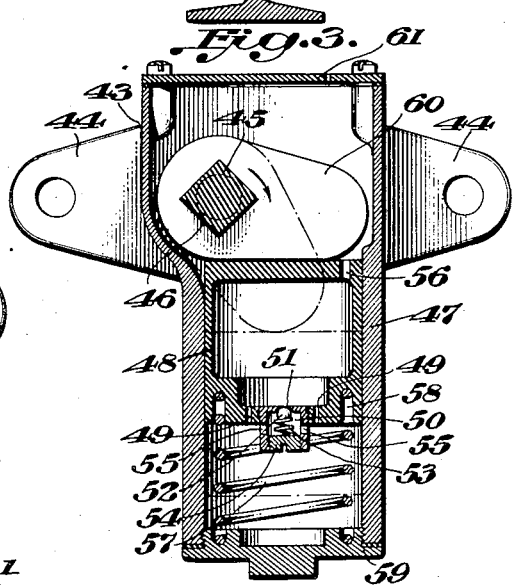
Fig. 3 is a sectional view of a modified form of the shock absorber shown in Figs. 1 and 2.

The form of shock absorber illustrated in Fig. 3 is similar to that shown in Figs. 1 and 2, and comprises a body member 43 having lugs 44 adapted to be secured to the vehicle frame, and having journaled therein a rock shaft 45 having a square portion 46. The lower portion of the body member 43 has formed thereon a cylinder 47 in which is reciprocably mounted a hollow piston 48. Piston 48 is provided with a pair of restricted openings 49 similar to the opening 28 in the piston 27 shown in Fig. 2, and piston 48 is also provided with a tubular member 50 having a port 51 normally closed by a ball valve 52, the latter being seated by a spring 53 interposed between a plug 54 carried by the member 49 and the ball valve 52. The tubular member 49 also has lateral openings 55 communicating with the interior of the cylinder 47. A vent 56 is formed in the upper wall of the piston and permits the passage of air therethrough.

The piston 47 is normally retained in the position shown in Fig. 3 by means of a coil spring 57, which engages a recessed portion 58 of the piston at its upper end and engages a cap 59 carried by the lower end of the cylinder 47 at its lower end.

The piston is reciprocated in this instance by means of a cam 60 secured to the rock shaft 45, it being understood that this rock shaft has secured thereto an arm similar to the arm 15 shown in Fig. 1, this arm being connected to the vehicle axle. The upper end of the body portion 43 of the shock absorber is closed by means of a cover plate 61.

The form of the invention illustrated in Fig. 3 operates as follows: When the vehicle frame and axle are in their normal relative position with respect to each other, the movable parts of the shock absorber assume the position shown in full lines in Fig. 3. When, however, these elements, namely, the vehicle frame and axle, are separated for any reason, the rock shaft 45 will be rotated and with it the cam 60. This rotation of the cam 60 forces the hollow piston 48 downwardly, and assuming that the cylinder 47 is substantially filled with fluid such as oil, it will be evident that this oil will be gradually forced upwardly through the restricted openings 49 to the interior of the hollow piston. When the parts return to their normal position, the piston will be forced upwardly by the spring 57, thereby unseating the ball valve 52 and permitting the return of the oil through the port 51 to the lower portion of the cylinder 47.

From the above specification describing two embodiments of shock absorbers constructed in accordance with my invention, it will be evident that in construction these devices are very simple and that they include a minimum number of parts. It will also be evident that the devices are adapted for successful operation throughout a wide range of movement.

While certain specific embodiments of the invention have been illustrated and described, it will be understood that further modifications and changes may be made in the construction and in the arrangement of the cooperating parts without departing from the spirit or scope of the invention as expressed in the following claims.

Having described my invention, what I claim and desire to secure by Letters Patent is:—

1. A shock absorber comprising, in combination, a casing adapted to be secured to a vehicle frame, a cylinder formed in said casing, a piston mounted in said cylinder, a conduit connected at its upper end to the cylinder, and a plug removably mounted in said casing and having openings therein connecting the lower end of said conduit with said cylinder.

2. A shock absorber comprising, in combination, a casing, a cylinder formed thereon, a piston mounted in said cylinder and having a piston pin extending upwardly therefrom, a rock shaft journaled in said casing, and means for operatively connecting said rock shaft to said piston pin for reciprocating said piston.

3. A shock absorber comprising, in combination, a casing adapted to be connected to a vehicle frame, a cylinder formed on said casing and opening into said casing, a hollow piston disposed in said cylinder and having a restricted opening and a port therein, and a resiliently actuated valve for closing said port.

4. A shock absorber comprising, in combination, a cylinder, a hollow piston mounted therein, and having a restricted opening and a port formed in the bottom thereof, resiliently actuated means for closing said port, means for positively actuating said piston in one direction, and resilient means for actuating said piston in the opposite direction.

5. In a shock absorber, a cylinder, a hollow piston mounted therein having a port in the bottom thereof, a resiliently actuated ball valve for closing said port, means for positively actuating said piston in one direction, and resilient means for actuating said piston in the opposite direction.

6. A shock absorber comprising, in combination, a body member, a rock shaft mounted therein, a cylinder carried by said body member, a piston mounted in said cylinder and having restricted openings therein, and a cam carried by said rock shaft for actuating said piston.

7. In a shock absorber, the combination of a casing comprising a compartment and a cylinder, a hollow piston operating in said cylinder, said piston being closed at both ends except for restricted ports, and means in said compartment for operating said piston.

8. In a shock absorber, the combination of a casing comprising a compartment and a cylinder having one end closed and the other end communicating with said compartment, a hollow trunk piston operating in said cylinder and having both ends closed except for restricted ports, and operating mechanism in said compartment connected to move said piston.

9. In a shock absorber, the combination of a casing comprising a compartment and a cylinder, a hollow piston operating in said cylinder and having both ends closed except for restricted ports, means in said compartment for operatively actuating said piston in one direction and resilient means in the cylinder for actuating the piston in the opposite direction.

In testimony whereof I affix my signature.

LIONEL M. WOOLSON.